United States Patent
Dargahi et al.

(10) Patent No.: US 11,923,784 B2
(45) Date of Patent: Mar. 5, 2024

(54) PYRAMID-TYPE MULTILEVEL CONVERTER TOPOLOGY

(71) Applicant: The Regents of the University of California, Oakland, CA (US)

(72) Inventors: Vahid Dargahi, Santa Cruz, CA (US); Keith A. Corzine, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/585,142

(22) Filed: Jan. 26, 2022

(65) Prior Publication Data

US 2022/0149746 A1 May 12, 2022

Related U.S. Application Data

(63) Continuation of application No. 16/864,604, filed on May 1, 2020, now abandoned.

(60) Provisional application No. 62/842,623, filed on May 3, 2019.

(51) Int. Cl.
*H02M 7/487* (2007.01)
*H02M 7/5395* (2006.01)
*H02M 7/483* (2007.01)

(52) U.S. Cl.
CPC ......... *H02M 7/487* (2013.01); *H02M 7/5395* (2013.01); *H02M 7/4835* (2021.05)

(58) Field of Classification Search
CPC ........ H02M 7/47; H02M 7/483; H02M 7/487; H02M 7/5395; H02M 7/49; H02M 7/4835
See application file for complete search history.

(56) References Cited

U.S. PATENT DOCUMENTS

| | | | | |
|---|---|---|---|---|
| 5,375,050 A * | 12/1994 | Nakata | ................... | H02M 7/487 363/136 |
| 5,481,448 A * | 1/1996 | Nakata | ................... | H02M 7/487 363/137 |
| 6,278,626 B1 * | 8/2001 | Teichmann | ........... | H02M 7/487 363/135 |
| 6,480,403 B1 * | 11/2002 | Bijlenga | ............... | H02M 7/487 363/132 |
| 6,490,185 B1 * | 12/2002 | Yamanaka | .......... | H02M 7/4833 363/132 |
| 10,116,229 B1 * | 10/2018 | Alshammaa | ............ | H02J 3/381 |
| 10,193,440 B1 * | 1/2019 | Venkataramanan | ........................ | H02M 7/4835 |
| 10,439,506 B2 * | 10/2019 | Götz | .................... | H02M 7/4835 |
| 10,541,623 B1 * | 1/2020 | Michal | ................... | H02M 7/487 |
| 2003/0026111 A1 * | 2/2003 | Steimer | ................... | H02M 7/49 363/16 |

(Continued)

*Primary Examiner* — Yusef A Ahmed

(74) *Attorney, Agent, or Firm* — Venable LLP; Henry J. Daley; Ryan T. Ward, Esq.

(57) ABSTRACT

A pyramid-type multilevel converter for converting DC voltage to AC voltage waveforms, and vice versa. An example device can use modular building blocks to form a selector stage, a converter stage, and at least one intermediate stage if the number of converters within the converter stage is greater than or equal to 3, with the converter stage switching at high-frequency PWM to chop the DC voltages. The modular building blocks are connected in a symmetric or asymmetric pyramid configuration having a base of using the converter stage and an apex of the selector stage.

16 Claims, 9 Drawing Sheets

(56) References Cited

U.S. PATENT DOCUMENTS

| | | | |
|---|---|---|---|
| 2003/0137857 A1* | 7/2003 | Yamanaka | H02M 7/53873 363/132 |
| 2010/0328977 A1* | 12/2010 | Asplund | H02M 7/4835 700/298 |
| 2013/0063989 A1* | 3/2013 | Jiang-Hafner | H02J 3/36 363/52 |
| 2013/0088906 A1* | 4/2013 | Jiang-Hafner | H02M 7/483 363/131 |
| 2014/0063885 A1* | 3/2014 | Itoh | H02M 7/483 363/132 |
| 2014/0117769 A1* | 5/2014 | Potharaju | H02J 1/102 307/82 |
| 2014/0169040 A1* | 6/2014 | Schroeder | H02M 1/0095 363/21.01 |
| 2014/0301119 A1* | 10/2014 | Chiang | H02M 7/4835 363/44 |
| 2014/0301124 A1* | 10/2014 | Wu | H02M 5/14 363/132 |
| 2015/0016169 A1* | 1/2015 | Honea | H02M 7/5387 363/132 |
| 2015/0288284 A1* | 10/2015 | Lavieville | H02M 3/158 363/34 |
| 2015/0311822 A1* | 10/2015 | Ma | H02M 7/4837 363/132 |
| 2015/0333658 A1* | 11/2015 | Lavieville | H02M 7/4837 318/400.26 |
| 2016/0064160 A1* | 3/2016 | Lemmen | H02M 7/483 307/113 |
| 2016/0308357 A1* | 10/2016 | Yuan | H02M 7/4835 |
| 2016/0329832 A1* | 11/2016 | Aeloiza | H02M 1/12 |
| 2016/0336872 A1* | 11/2016 | Cheng | H02M 7/487 |
| 2017/0099013 A1* | 4/2017 | Martini | H02M 7/487 |
| 2017/0185130 A1* | 6/2017 | Zhang | H01L 29/1608 |
| 2017/0250533 A1* | 8/2017 | de Jesus Cardoso Filho | H02M 1/007 |
| 2018/0054144 A1* | 2/2018 | Mohanaveeramani | H02M 1/12 |
| 2018/0123444 A1* | 5/2018 | Mohanaveeramani | H02M 5/293 |
| 2018/0248493 A1* | 8/2018 | Mihalache | H02M 7/487 |
| 2019/0052177 A1* | 2/2019 | Lu | H02M 7/217 |
| 2019/0238062 A1* | 8/2019 | Lu | H03K 17/602 |
| 2019/0267889 A1* | 8/2019 | McBryde | H02M 7/483 |
| 2019/0363644 A1* | 11/2019 | Li | H02M 7/5387 |
| 2020/0099302 A1* | 3/2020 | Webb | H02M 3/158 |
| 2020/0136523 A1* | 4/2020 | Gazit | H02M 7/64 |
| 2020/0177092 A1* | 6/2020 | Ledezma | H02P 27/08 |
| 2021/0044198 A1* | 2/2021 | Chen | H02M 1/32 |
| 2021/0067057 A1* | 3/2021 | Abarzadeh | H02M 7/4837 |
| 2022/0109381 A1* | 4/2022 | Yenduri | H02M 7/4807 |
| 2022/0294333 A1* | 9/2022 | Ramirez Sanchez | H02M 5/4585 |

* cited by examiner

PYRAMID-TYPE MULTILEVEL CONVERTER TOPOLOGY

CROSS-REFERENCE TO RELATED APPLICATIONS

This application is a continuation of U.S. patent application Ser. No. 16/864,604, filed May 1, 2020, which claims priority benefit from U.S. provisional patent application No. 62/842,623, filed on May 3, 2019, the entire content of which is incorporated herein by reference.

BACKGROUND

1. Technical Field

The present disclosure relates to the conversion of Direct Current (DC) voltages into Alternating Current (AC) voltages and vice versa.

2. Introduction

Topologically distinct variants of multilevel power converters have been in existence since the emergence of three-level neutral-point-clamped (NPC) converters. Classic multilevel converters in a range of 3.3 to 13.8 kV include topologies such as NPC, active NPC (A-NPC), neutral-point-piloted (NPP), cascaded H-bridge (CHB), flying-capacitor multilevel (FCM), and modular multilevel converters (MMCs). However, these topologies have disadvantages including the excessive use of passive clamping devices (such as diodes and bulky flying-capacitors with higher voltage and current ratings), inabilities to reach higher power ratings, lower reliability due to the high number of employed devices, and/or additional control complexity. This has impeded the practicality and viability of classic multilevel converter topologies with a high number of cells and voltage levels for medium-voltage (MV) applications.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An example pyramid-type multilevel converter as disclosed herein can include: a selector stage; a converter stage; and at least one intermediate stage between said selector stage and said converter stage, where: said selector stage and said at least one intermediate stage are made of a plurality of modular building blocks; said converter stage comprises a plurality of n converter circuits to output phase voltage references; and said selector stage, said converter stage, and said at least one intermediate stage are electrically connected in a pyramid formation having a base of said converter stage and an apex of said selector stage.

An example integrated circuit for generating an Alternating Current (AC) voltage waveform as disclosed herein can include: a selector stage; a converter stage; and at least one intermediate stage between said selector stage and said converter stage, where: said selector stage and said at least one intermediate stage are made of a plurality of modular building blocks; said converter stage comprises a plurality of n converter circuits to output phase voltage references; and said selector stage, said converter stage, and said at least one intermediate stage are electrically connected in a pyramid formation having a base of said converter stage and an apex of said selector stage.

DETAILED DESCRIPTION

Figure 1:
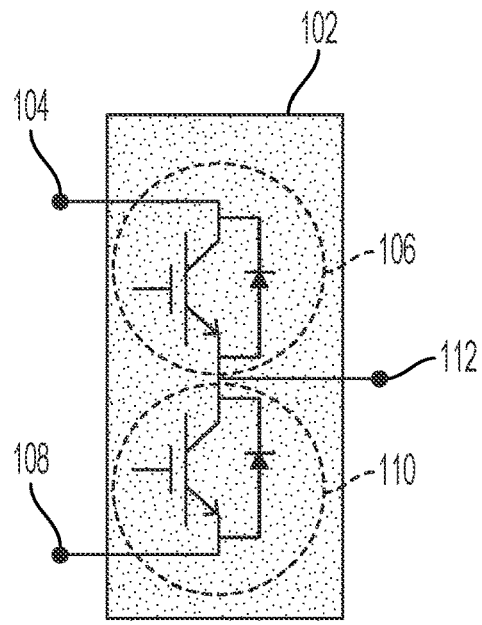
FIG. 1 illustrates an example modular soft-switching low/line-frequency building block according to an embodiment of the current invention.

Various embodiments of the disclosure are described in detail below. While specific implementations are described, it should be understood that this is done for illustration purposes only. Other components and configurations may be used without parting from the spirit and scope of the disclosure.

Converting DC voltages into AC voltage waveforms, and vice versa, as disclosed herein, can be accomplished using a Pyramid Type (PT) multilevel converter topology for interconnection of multiple converters. The converter topology disclosed herein interconnects variant converter topologies, such as two-level and/or multilevel types employing specific arrangements of soft-switching and LF-PWM or line-frequency power semiconductor switches. Example benefits which may occur in specific embodiments due to implementation of the PT topology can include a reduction in the operating junction temperature of the semiconductor power switches, as well as a reduction in the number of passive components such as clamping-diodes and flying-capacitors (FCs). In turn, such benefits can improve the current rating, switching frequency, power-level, and power quality of the overall multilevel converter system.

While specific configurations are disclosed with respect to two-level, three-level, and other-level converters, the PT topology shared among the various examples can be applied to any other similar converter system for converting DC voltage to AC voltage waveforms and vice versa. For example, some of the examples provided herein use the PT topology to interconnect multiple converters, including two-level and multilevel inverters. In addition, disclosed is a five-level converter topology in two distinct configurations. The first five-level configuration is an interconnection of four two-level PWM converters. In this first example, the five-level converter's phase-leg is realized using eight HF Insulated-Gate Bipolar Transistors (HF-IGBTs) with a blocking voltage of 1 p.u., four LF-IGBTs with blocking voltage of 1 p.u., and 2 line-frequency IGBTs with blocking voltage of 2 p.u. The second five-level configuration is formed through an interconnection of 2 three-level PWM converters. The second 5-level converter structure uses eight LF-IGBTs with blocking voltage of 1 p.u., four HF-IGBTs with blocking voltage of 1 p.u., and 2 line-frequency IGBTs with blocking voltage of 2 p.u.

Moreover, the five-level converter configurations disclosed herein do not use any passive devices such as bulky FCs or clamping-diodes in their topology. Instead, the power circuit comprises only the HF-PWM, LF-PWM, and the line-frequency IGBTs. Assuming that the dc-link in the proposed five-level converter is powered through a 4 p.u. DC voltage-source, all the HF-PWM and LF-PWM IGBTs will feature a modular structure with a blocking voltage of 1 p.u. It is worth pointing out that the two line-frequency IGBTs must withstand a 2 p.u. voltage. Due to the elimination of the passive clamping-devices including capacitors and diodes, the proposed five-level converter can be used for MV high-power applications. In addition, distinct modulation methods can be used to control the derived new five-level topologies from the PT multilevel converter as a tying-converter. These and other variations shall be described herein as the various embodiments of the illustrations are set forth. While respective examples may be directed to using the described configurations for conversion of DC voltages to AC voltage waveforms or vice versa, all configurations described herein can be used for both purposes unless expressly indicated. The embodiments and examples outlined herein are exemplary and can be implemented in any combination thereof, including combinations that exclude, add, or modify certain steps.

FIG. 1 illustrates an example modular building block 102, also described as a Power Electronics Building Block (PEBB). The modular building block 102 has a first input 104 connected to a first IGBT 106, and a second input 108 connected to a second IGBT 110. The two IGBTs 106, 110 are electrically connected at a midpoint 112, which serves as an output terminal. Please note that these and all other semiconductor power switches (such as the IGBTs 106, 110) used within the various PT topologies described are soft-switching and LF-PWM or line-frequency devices.

Figure 2:
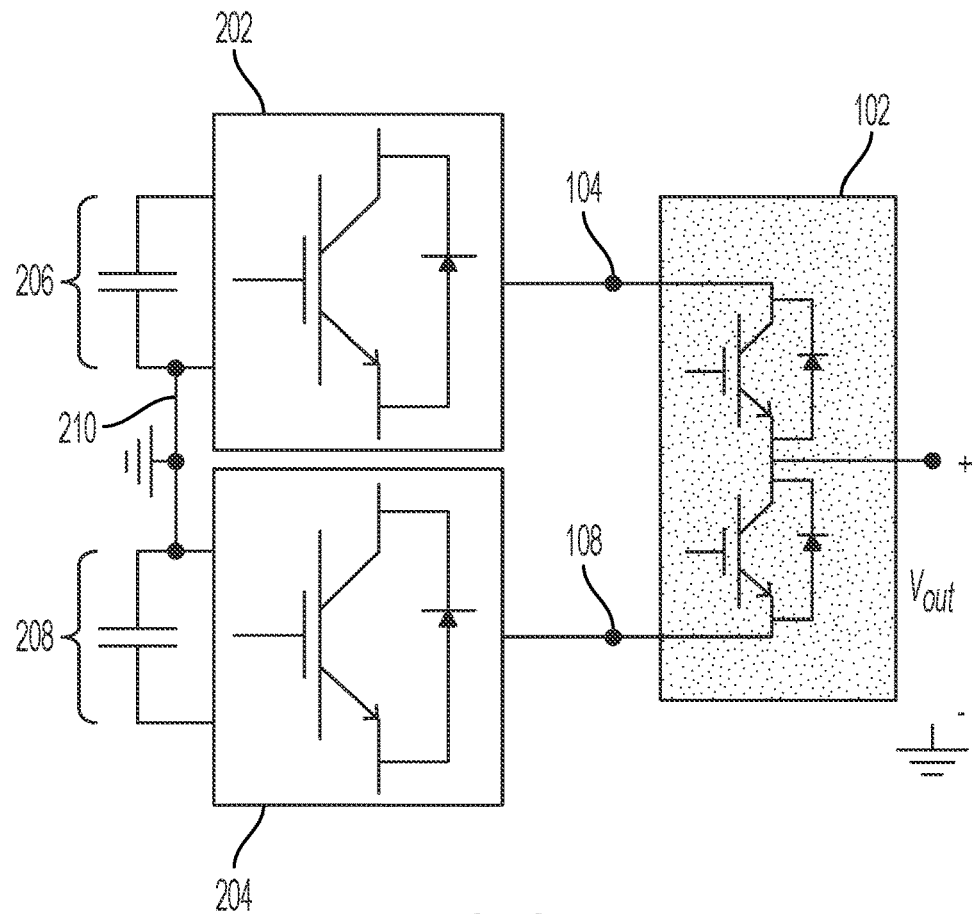
FIG. 2 illustrates a modular soft-switching line-frequency building block connecting two two-level (or multilevel) PWM converters according to an embodiment of the current invention.

FIG. 2 illustrates a modular building block 102 tying/connecting two two-level or multilevel converters 202, 204. Each of the two-level (or multilevel) converters 202, 204 has an output which respectively connects to an input 104, 108 of the modular building block 102. In case of tying 2 two-level converters, the output of the two-level converter 202, 204 can be from the midpoint of the respective IGBTs in the two-level converter 202, 204. Across each converter 202, 204 is a voltage 206, 208, which is the DC voltage being input to a particular converter. If the voltages are identical across all of the converters, the voltage has a 1 p.u. (per unit) value, indicating the voltage value equality or comparison across components. The converters 202, 204 are further connected 210 together.

In single-phase applications, the connection 210 can be tied to the output of the modular building block 102. This connection results in grounding the overall system between ground and the output of the modular building block 102.

Figure 3:
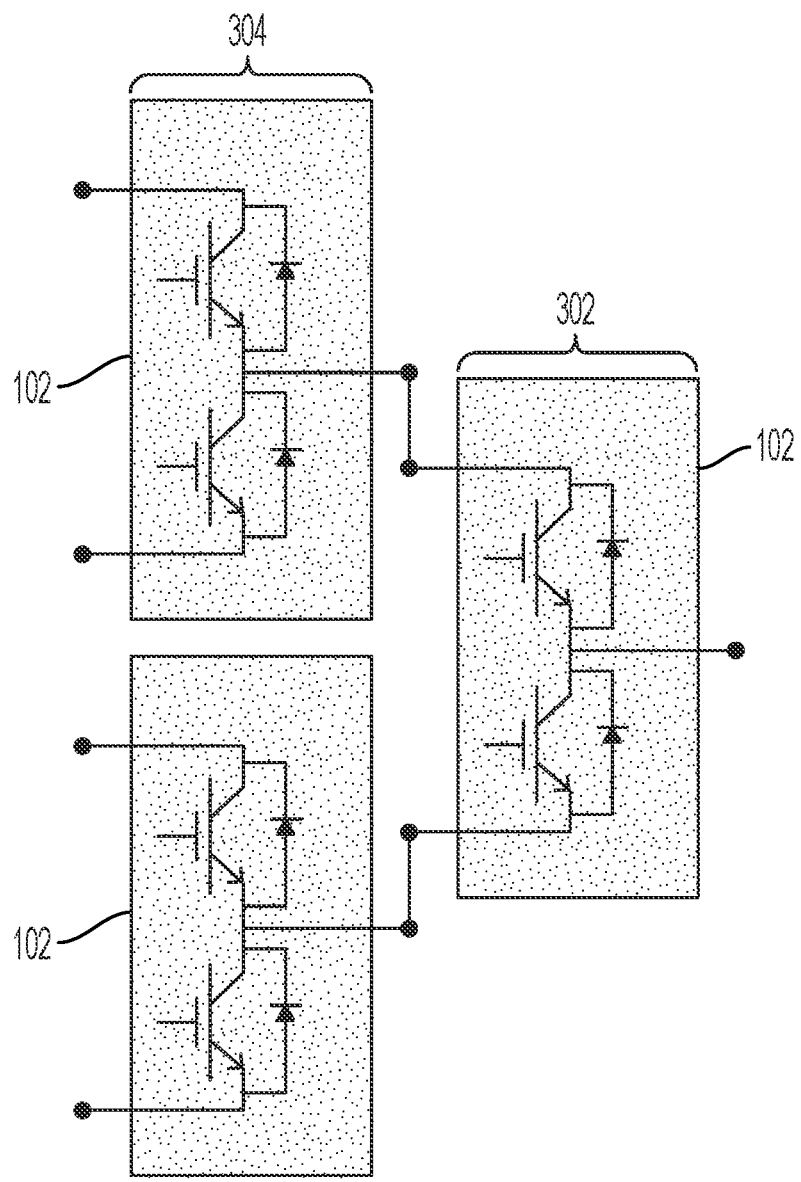
FIG. 3 illustrates modular soft-switching low/line-frequency building blocks being organized into a symmetric pyramid according to an embodiment of the current invention.

FIG. 3 illustrates modular building blocks 102 being organized into a symmetric pyramid, with outputs from two modular building blocks being fed into the third as inputs. When the modular building blocks are organized into a Pyramid Type (PT) structure as illustrated, the final modular building block is a "selector stage" 302, because it effectively selects between positive and negative half-cycles of all of the input voltages. Any layer of modular building blocks between converter devices and the selector stage 302 are part of an "intermediate stage" 304. As illustrated in FIG. 3, the intermediate stage 304 consists of a single layer/column of modular building blocks. However, in other configurations of the PT structure, there can be multiple layers of modular building blocks in the intermediate stage 304.

Figure 4:
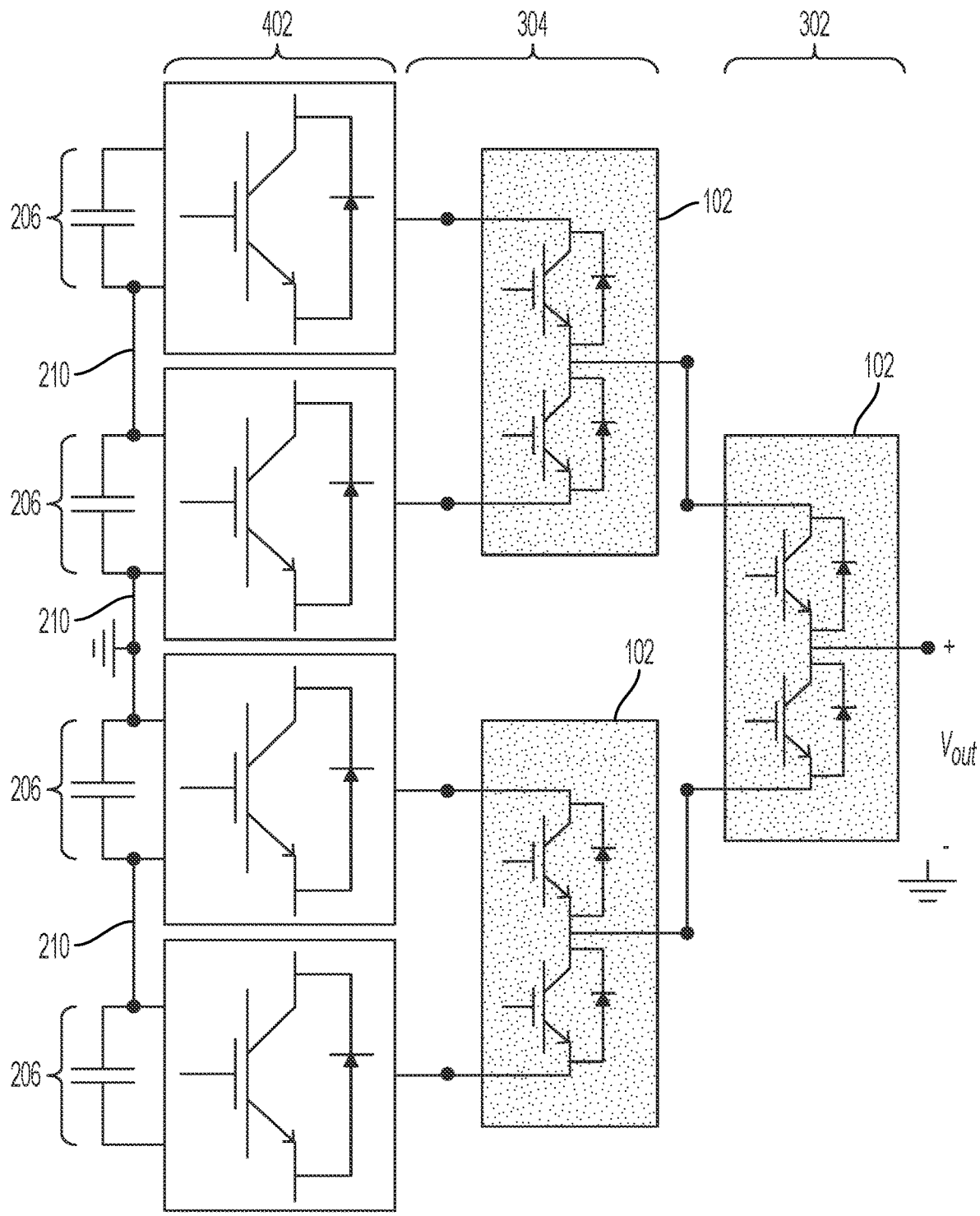
FIG. 4 illustrates a symmetric pyramid structure being used to connect four two-level (or multilevel) PWM converters according to an embodiment of the current invention.

FIG. 4 illustrates a symmetric pyramid structure being used to tie/connect four two-level (or multilevel) PWM converters. In this configuration, a modular building block 102 is used for the selector stage 302, two modular building blocks 102 are used for the intermediate stage 304, and four two-level (or multilevel) converters are used for the converter stage 402. Each of the two-level (or multilevel) converters have an input voltage 206, and are electrically connected together 210. DC voltage levels 206 on the converters of the converter stage 402 are chopped and applied as inputs into the interconnected/intertied system of PEBB modules, and as the respective IGBTs of each modular building block are gated ON and OFF in a LF-PWM manner, the HF-PWM chopped DC voltages 206 generated from the converter stage 402 are combined or subtracted, resulting in an output at the selector stage 302 at the voltage level desired.

Figure 5:
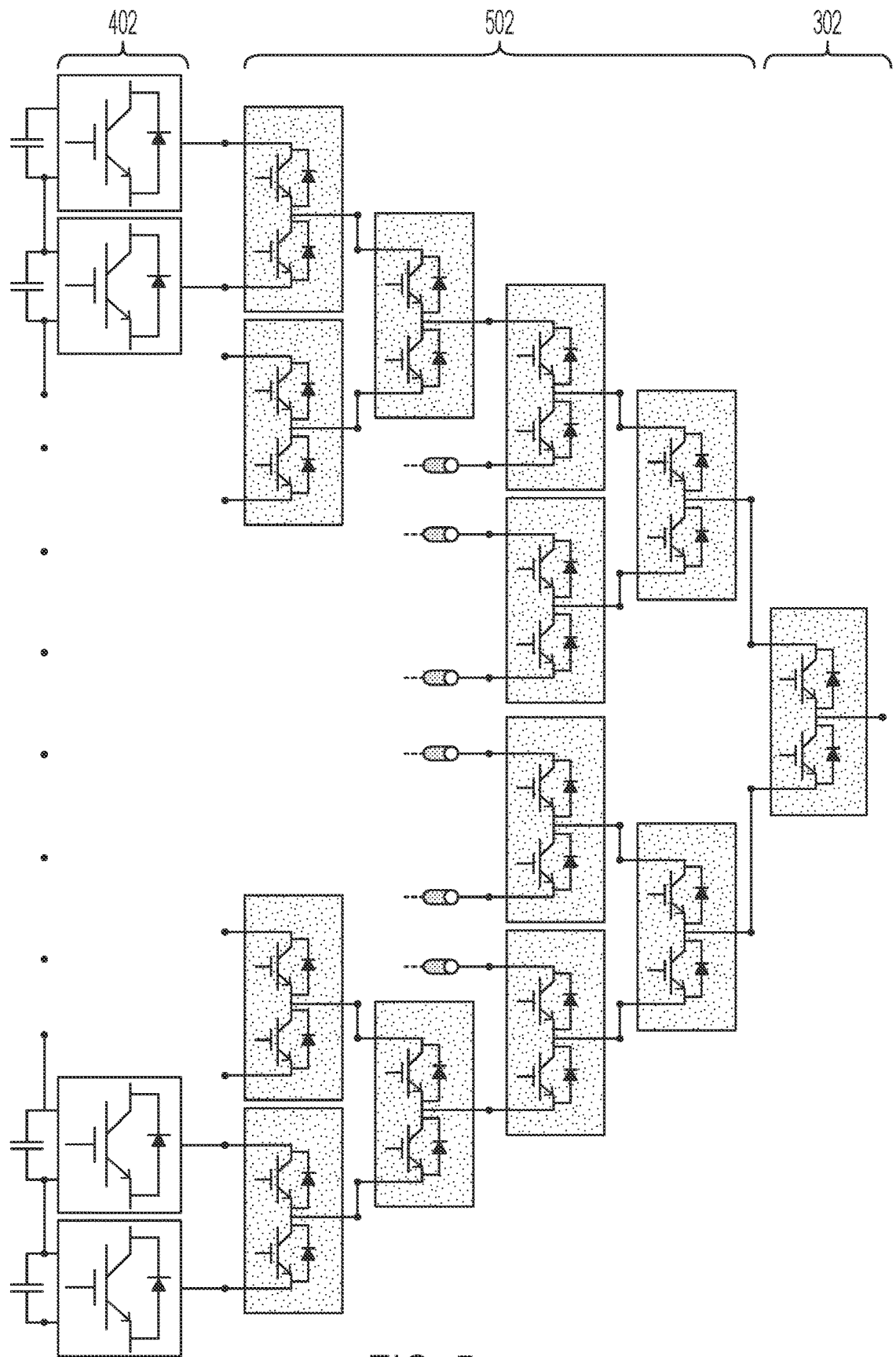
FIG. 5 illustrates a symmetric pyramid structure being used to connect multiple two-level (or multilevel) PWM converters according to an embodiment of the current invention.

FIG. 5 illustrates a pyramid structure being used to connect multiple two-level (or multilevel) converters. This example is similar to that of FIG. 4, but with an intermediate stage 502 of multiple layers of modular building blocks connected. Please note that while the illustrated example has four layers within the intermediate stage, this is only an example, and other configurations may have different numbers of layers. Also note that the illustrated example does not illustrate all of the blocks in layers 402 and 502 which would be physically present, illustrated by the empty connections of the illustrated modules.

Figure 6:
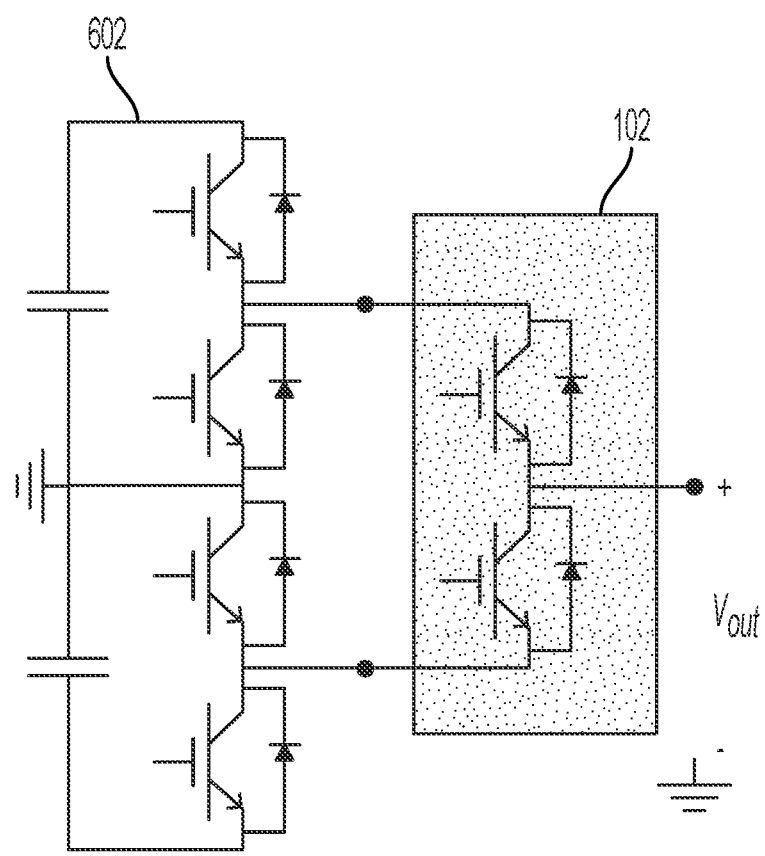
FIG. 6 illustrates a modular soft-switching line-frequency building block connecting two two-level PWM topology to form an ultimate three-level PWM converter according to an embodiment of the current invention.

FIG. 6 illustrates a modular building block 102 connecting two two-level PWM converter topologies 602, forming an ultimate three-level PWM converter. This is realized by interconnection of two two-level converters and the modular building block 102. The interconnection of the two two-level converters includes, as illustrated, a connection between the midpoint of a first two-level converter and midpoint of a second two level converter through the modular building block 102.

Figure 7:
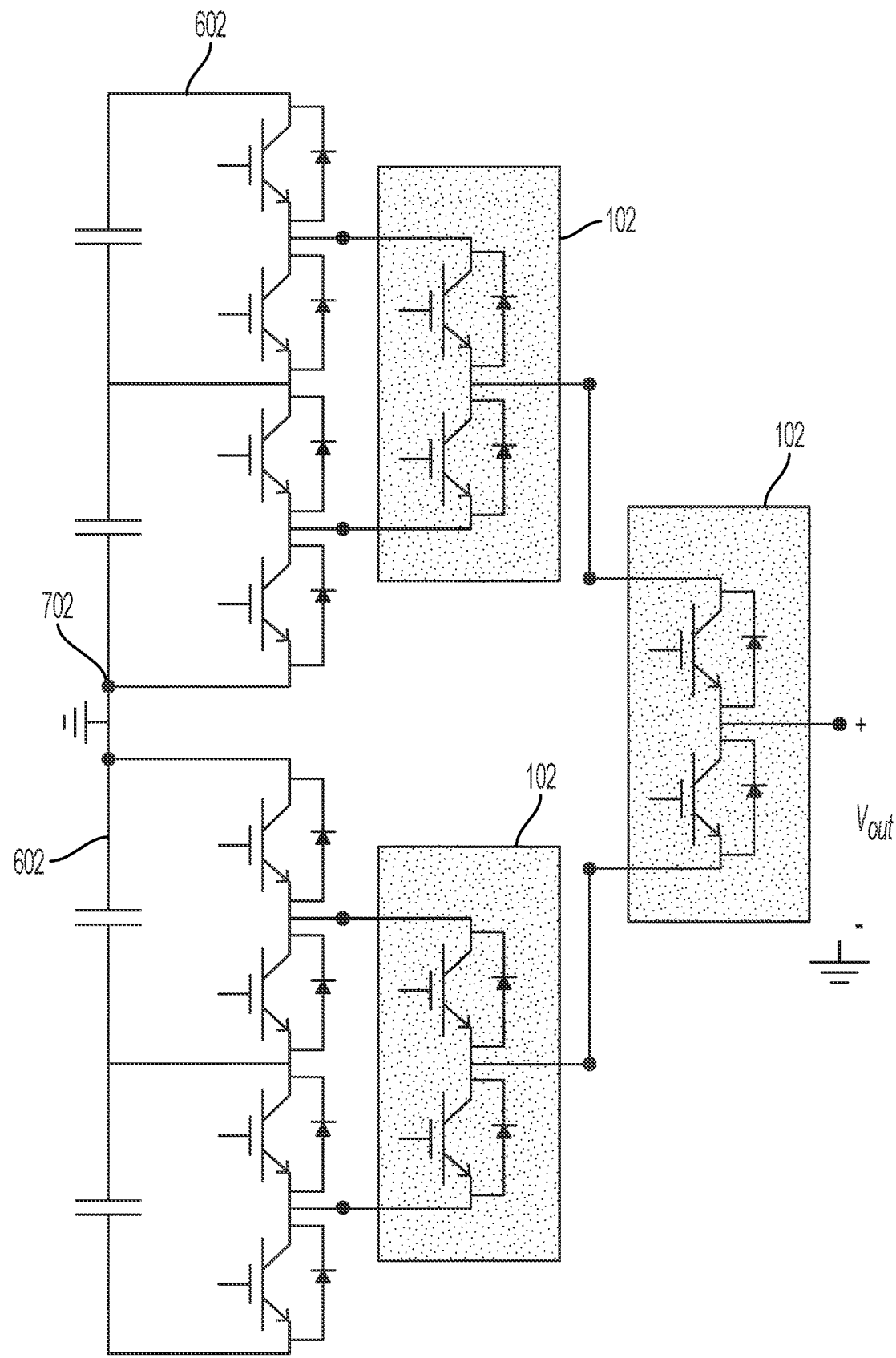
FIG. 7 illustrates a five-level PWM topology formed by interconnection of four two-level PWM converters according to an embodiment of the current invention.

FIG. 7 illustrates a five-level topology formed by interconnection of four two-level PWM converters. In this example, the overall modular blocks 102 include one line-frequency modular block (the far right layer) as a selector stage and two LF-PWM modular blocks (one layer) as an intermediate stage connecting to four two-level PWM converters 602. In addition, the four two-level PWM converters 602 are connected 702 to a common ground.

Figure 8:
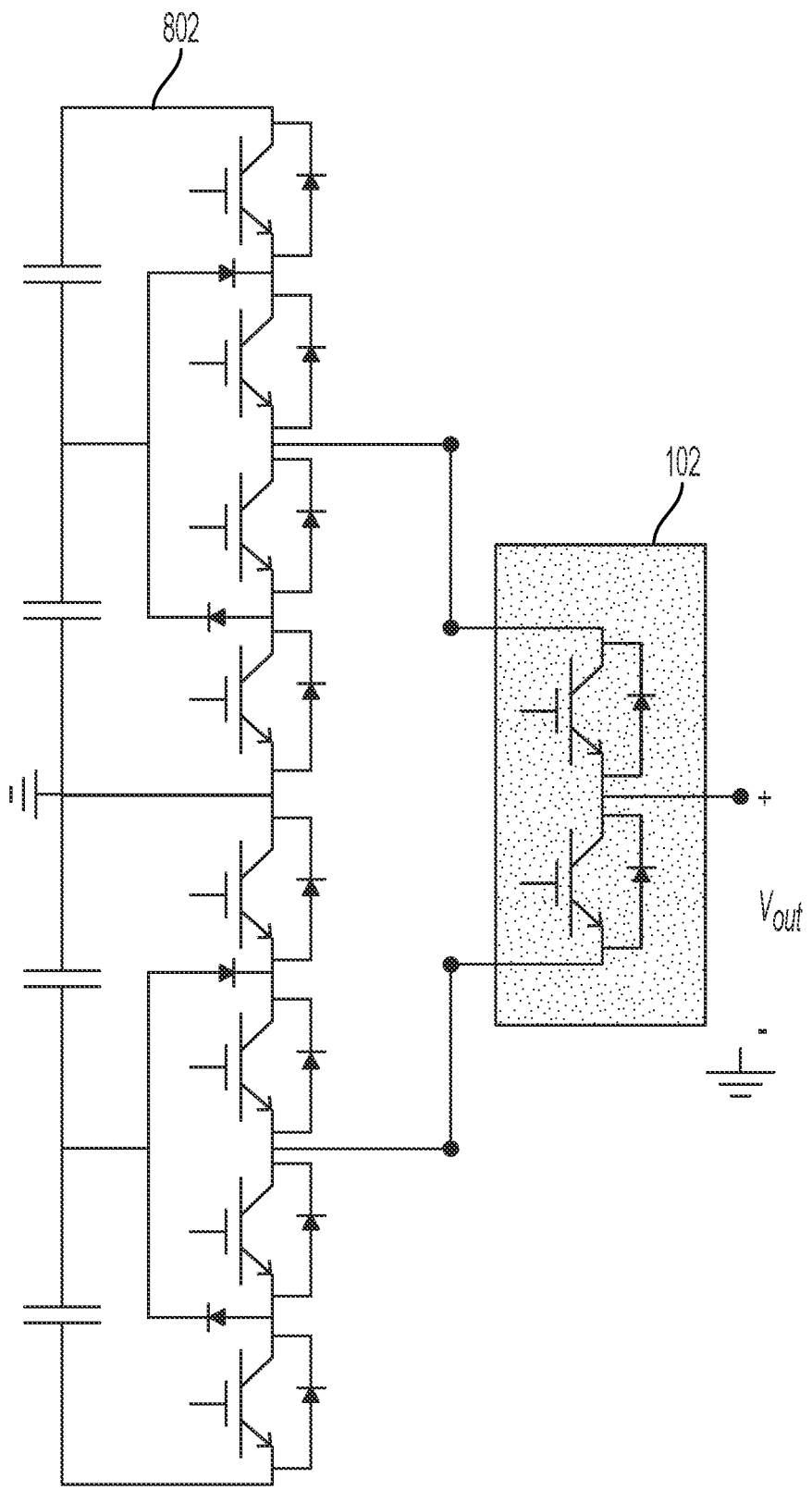
FIG. 8 illustrates a five level PWM topology formed by interconnection of two three-level PWM NPC converters according to an embodiment of the current invention.

FIG. 8 illustrates a five-level topology 802 formed by interconnection of two three-level PWM NPC (Neutral Point Clamped) converters using a single line-frequency modular block 102 (one layer) as a selector stage. This five-level converter topology employs 4 clamping-diodes, with blocking voltage of 1 p.u. each (per-converter's phase-leg), whereas the classic five-level PWM NPC needs 12 clamping-diodes with blocking voltages of 1 p.u. per-phase.

Figure 9:
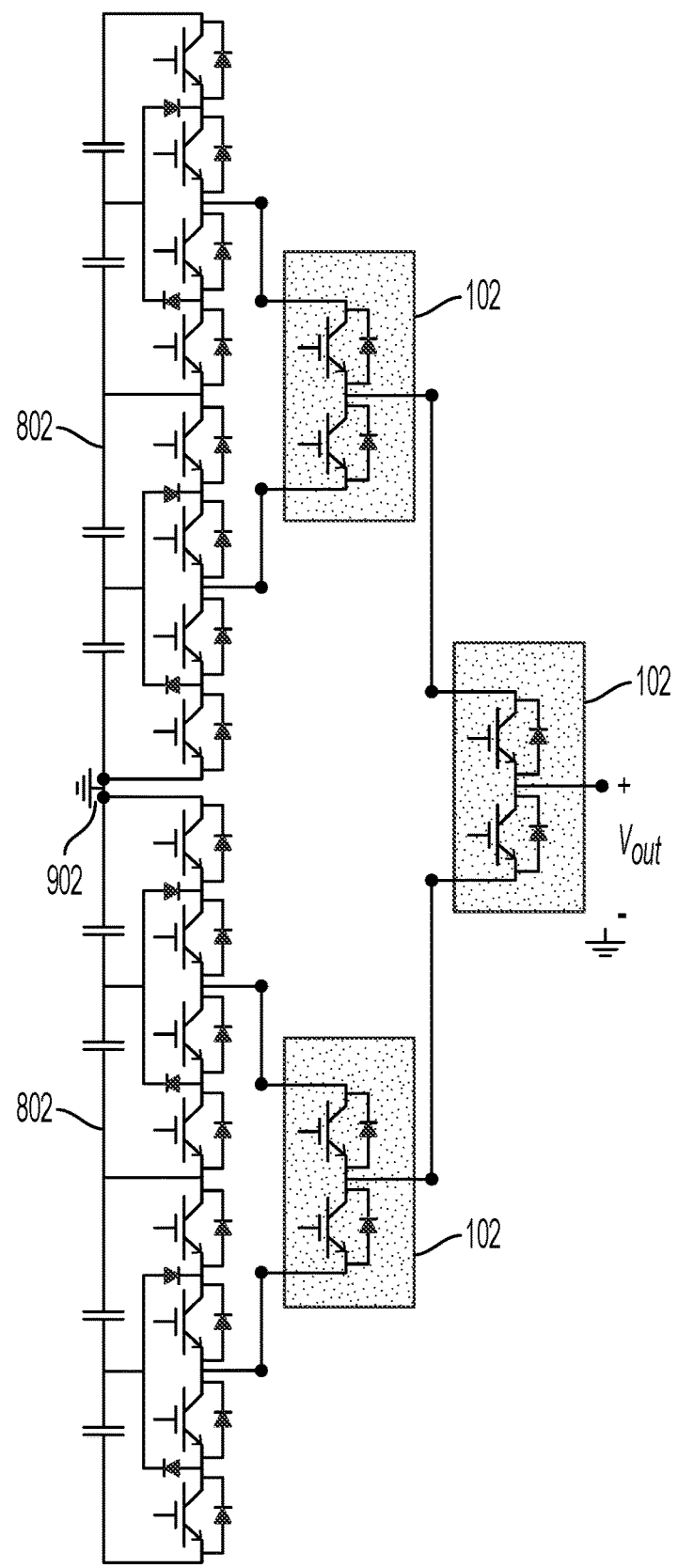
FIG. 9 illustrates a nine level topology formed by interconnection of four three-level PWM NPC converters according to an embodiment of the current invention.

FIG. 9 illustrates a nine-level topology formed by interconnection of four three-level PWM NPC converters (or two of the five level converters 802 illustrated in FIG. 8) and the modular building block 102. In this derived-topology, a single line-frequency modular block is used as a selector stage (one layer) and an intermediate stage is formed by one layer of two LF-PWM modular blocks. Like other topologies, the respective converters are electrically connected 902. This derived nine-level PWM converter topology employs eight clamping-diodes with blocking voltage of 1 p.u. each (per-converter's phase-leg). By contrast, the classic nine-level PWM NPC needs 56 clamping-diodes with blocking voltage of 1 p.u. per-converter's phase-leg.

Figure 10:
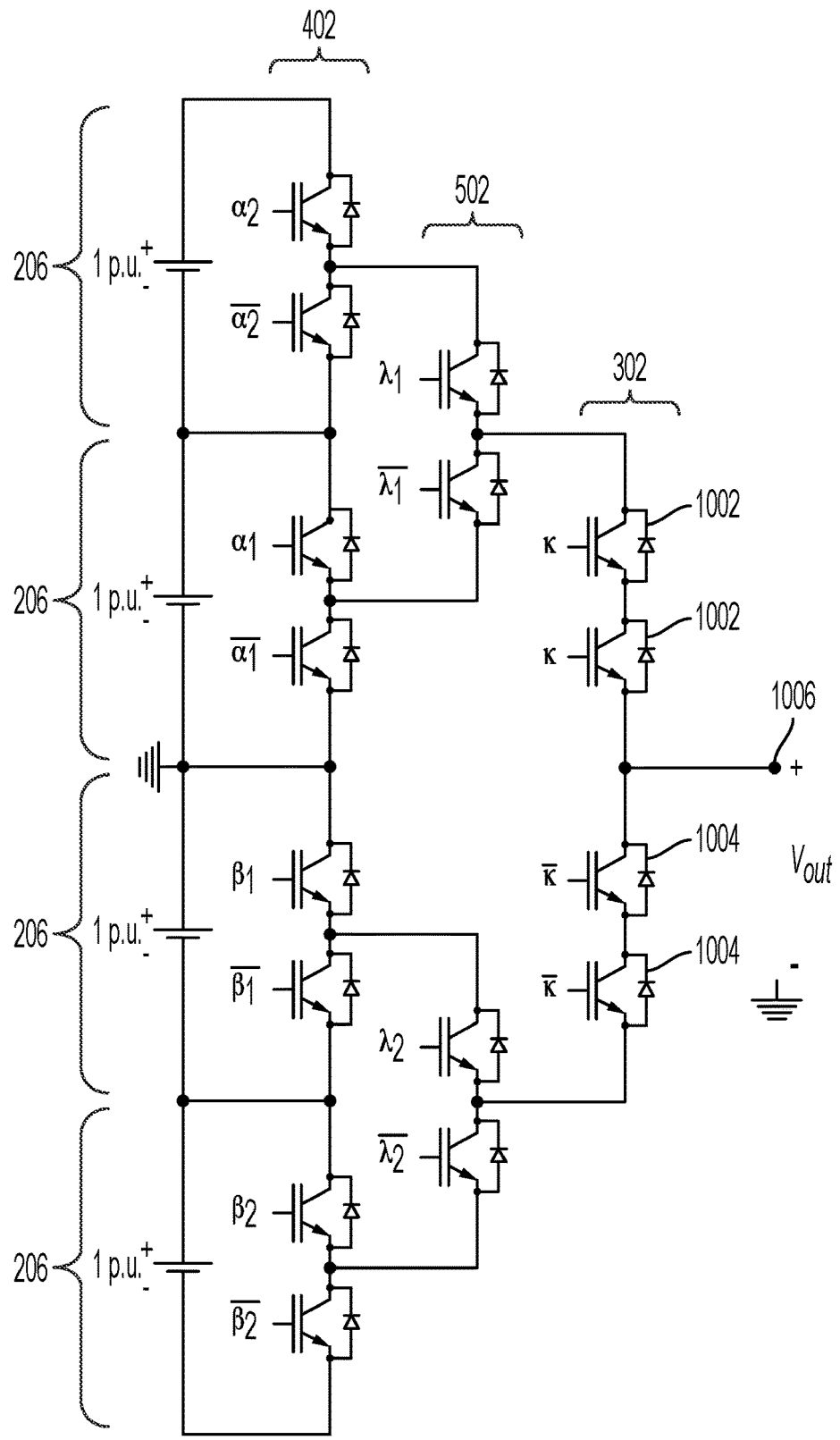
FIG. 10 illustrates a five level PWM topology according to an embodiment of the current invention.

FIG. 10 illustrates a five-level topology for the purposes of describing the derived control technique for the disclosed topologies. While differences will exist between any particular configurations, the overall concepts are shared between configurations.

As illustrated in the various topologies previously described, the converter stage 402 has DC voltage sources 206 for multiple converters. These converters chop the input DC voltages 206 in a HF-PWM scheme to generate an input voltages to an intermediate stage 502, which then provides an output to a selector stage 302. In this case, the selector stage 302 is made of two sets of two IGBTs 1002, 1004. Each respective IGBT has a 1 p.u. voltage rating, allowing each set 1002, 1004 to have a 2 p.u. voltage rating due to their series connection. The output 1006 of the selector stage 302 is electrically located at the midpoint between the two sets of IGBTs 1002, 1004. While multiple configurations are possible using the illustrated circuit, two specific configurations will be discussed.

In the first configuration, the converter stage 402 uses hard-switching HF-PWM IGBTs, the intermediate stage 502 uses soft-switching LF-PWM IGBTs, and the selector stage 302 uses soft-switching line-frequency IGBTs. For each stage 302, 402, 502, and each modular building block, there are switching pulses that turn-on and turn-off the respective IGBTs. For the first exemplary configuration, the converter's phase-leg is realized using eight HF-PWM IGBTs with blocking voltage of 1 p.u. and switching pulses of $\alpha_1, \overline{\alpha_1}, \alpha_2, \overline{\alpha_2}, \beta_1, \overline{\beta_1}, \beta_2, \overline{\beta_2}$, four LF-PWM IGBTs with blocking voltage of 1 p.u. and control pulses of $\lambda_1, \overline{\lambda_1}, \lambda_2, \overline{\lambda_2}$, and two line-frequency IGBTs with blocking voltage of 2 p.u. and gate signals of $\kappa$ and $\overline{\kappa}$. (Two 1 p.u. IGBTs are series connected to realize a 2 p.u. switch).

The Phase-Disposition PWM (PD-PWM) method is employed to control the HF-PWM IGBTs in this configuration. In the equations that follow, M is the modulation index and $f_r$ is the reference frequency so that or $\omega_r = 2\pi f_r$, and $\varphi$ is the reference phase angle. Assuming $\Omega_{P1}(t)$ as the first positive carrier occupying the band between 0 and 0.5 ($0 \leq \Omega_{P1}(t) \leq 0.5$), $\Omega_{P2}(t)$ as the second positive carrier occupying the band between 0.5 and 1 ($0.5 \leq \Omega_{P2}(t) \leq 1$), $\Omega_{N1}(t)$ as the first negative carrier occupying the band between −0.5 and 0 ($-0.5 \leq \Omega_{N1}(t) \leq 0$), $\Omega_{N2}(t)$ as the second negative carrier occupying the band between −1 and −0.5 ($-1 \leq \Omega_{N2}(t) \leq -0.5$), PWM signals are generated as follows:

$$\Psi(t) = M\sin(\omega_r t + \varphi) \quad -\varphi \leq \omega_r t < 2\pi - \varphi \quad (1)$$

$$\alpha_2(t) = \begin{cases} 1 & \Omega_{P2}(t) \leq \Psi(t) \\ 0 & \Omega_{P2}(t) > \Psi(t) \end{cases} \quad (2)$$

$$\alpha_1(t) = \begin{cases} 1 & \Omega_{P1}(t) \leq \Psi(t) \\ 0 & \Omega_{P1}(t) > \Psi(t) \end{cases} \quad (3)$$

$$\beta_1(t) = \begin{cases} 1 & \Omega_{N1}(t) \leq \Psi(t) \\ 0 & \Omega_{N1}(t) > \Psi(t) \end{cases} \quad (4)$$

$$\beta_2(t) = \begin{cases} 1 & \Omega_{N2}(t) \leq \Psi(t) \\ 0 & \Omega_{N2}(t) > \Psi(t) \end{cases} \quad (5)$$

$$\lambda_1(t) = \begin{cases} 1 & 0.5 \leq \Psi(t) \\ 0 & 0.5 > \Psi(t) \end{cases} \quad (6)$$

$$\lambda_2(t) = \begin{cases} 1 & -0.5 \leq \Psi(t) \\ 0 & -0.5 > \Psi(t) \end{cases} \quad (7)$$

$$\kappa(t) = \begin{cases} 1 & -\varphi \leq \omega_r t < \pi - \varphi \\ 0 & \pi - \varphi \leq \omega_r t \leq 2\pi - \varphi \end{cases} \quad (8)$$

In a second configuration, the converter stage 402 uses hard-switching LF-PWM IGBTs, the intermediate stage 502 uses hard-switching HF-PWM IGBTs, and the selector stage 302 uses soft-switching line-frequency IGBTs. In this configuration, the converter's phase-leg is realized using eight LF-PWM IGBTs with blocking voltage of 1 p.u. and switching pulses of $\alpha_1, \overline{\alpha_1}, \alpha_2, \overline{\alpha_2}, \beta_1, \overline{\beta_1}, \beta_2, \overline{\beta_2}$, four HF-PWM IGBTs with blocking voltage of 1 p.u. and control pulses of $\lambda_1, \overline{\lambda_1}, \lambda_2, \overline{\lambda_2}$, and two line-frequency IGBTs with blocking voltage of 2 p.u. and gate signals of $\kappa$ and $\overline{\kappa}$, The switching technique is divided into two cases. The modulation index for the first case is considered $0.5 \leq M \leq 1$ while it is assumed $0 \leq M \leq 0.5$ in the second case. In controlling the first case of this configuration, the two carriers of the PD (Phase Disposition) PWM modulator occupy bands between −0.5 and 0.5 such that ($-0.5 \leq \Omega_N(t) \leq 0$) and ($0 \leq \Omega_P(t) \leq 0.5$). The zero-crossing angle of the $\varphi$ and the intersection angle $\theta$ of the sinusoidal reference waveform with constant value of 0.5 are used to generate four pulses of $\gamma_1(t), \gamma_2(t), \gamma_3(t)$, and $\eta(t)$. These pulses are added to the $\Psi(t)$ to form a bounded reference waveform of $\chi(t)$. The bounded reference waveform $\chi(t)$ occupies the bands between −0.5 and 0.5, and is used for PWM comparison with PD-PWM carriers of $\Omega_P(t)$ and $\Omega_N(t)$ to generate the PWM pulses for the IGBTs as follows:

$$\theta = \sin^{-1}\left(\frac{1}{2M}\right) \quad 0.5 \leq M \leq 1 \quad (9)$$

$$\gamma_1(t) = \begin{cases} 0.5 & -\varphi \leq \omega_r t \leq \theta - \varphi \\ 0 & \theta - \varphi \leq \omega_r t \leq 2\pi - \varphi \end{cases} \quad (10)$$

$$\gamma_2(t) = \begin{cases} 0 & -\varphi \leq \omega_r t \leq \pi - \theta - \varphi \\ 0.5 & \pi - \theta - \varphi \leq \omega_r t \leq \pi - \varphi \\ 0 & \pi - \varphi \leq \omega_r t \leq 2\pi - \varphi \end{cases} \quad (11)$$

$$\gamma_3(t) = \begin{cases} 0 & -\varphi \leq \omega_r t \leq \pi + \theta - \varphi \\ 0.5 & \pi + \theta - \varphi \leq \omega_r t \leq 2\pi - \theta - \varphi \\ 0 & 2\pi - \theta - \varphi \leq \omega_r t \leq 2\pi - \varphi \end{cases} \quad (12)$$

-continued $$\eta(t) = \begin{cases} -0.5 & -\varphi \le \omega_r t \le \pi - \varphi \\ 0 & \pi - \varphi \le \omega_r t \le 2\pi - \varphi \end{cases} \quad (13)$$

$$\chi(t) = \Psi(t) + \gamma_1(t) + \gamma_2(t) + \gamma_3(t) + \eta(t) \; 0.5 \le M \le 1 \quad (14)$$

$$\alpha_2(t) = \begin{cases} 1 & 0.5 \le \Psi(t) \\ 0 & 0.5 > \Psi(t) \end{cases} \quad (15)$$

$$\alpha_1(t) = \alpha_2(t) \quad (16)$$

$$\beta_1(t) = \begin{cases} 1 & -0.5 \le \Psi(t) \\ 0 & -0.5 > \Psi(t) \end{cases} \quad (17)$$

$$\beta_2(t) = \beta_1(t) \quad (18)$$

$$\lambda_1(t) = \begin{cases} 1 & \Omega_P(t) \le \chi(t) \\ 0 & \Omega_P(t) > \chi(t) \end{cases} \quad (19)$$

$$\lambda_2(t) = \begin{cases} 1 & \Omega_N(t) \le \chi(t) \\ 0 & \Omega_N(t) > \chi(t) \end{cases} \quad (20)$$

$$\kappa(t) = \begin{cases} 1 & -\varphi \le \omega_r t \le \pi - \varphi \\ 0 & \pi - \varphi \le \omega_r t \le 2\pi - \varphi \end{cases} \quad (21)$$

The control and switching pulses for the second case $0 \le M \le 0.5$ are derived as follows:

$$\alpha_2(t) = 0 \quad (22)$$

$$\alpha_1(t) = \alpha_2(t) \quad (23)$$

$$\beta_1(t) = 1 \quad (24)$$

$$\beta_2(t) = \beta_1(t) \quad (25)$$

$$\lambda_1(t) = \begin{cases} 1 & \Omega_P(t) \le \Psi(t) \\ 0 & \Omega_P(t) > \Psi(t) \end{cases} \quad (26)$$

$$\lambda_2(t) = \begin{cases} 1 & \Omega_N(t) \le \Psi(t) \\ 0 & \Omega_N(t) > \Psi(t) \end{cases} \quad (27)$$

$$\kappa(t) = \begin{cases} 1 & -\varphi \le \omega_r t \le \pi - \varphi \\ 0 & \pi - \varphi \le \omega_r t \le 2\pi - \varphi \end{cases} \quad (28)$$

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

A pyramid-type multilevel converter topology as disclosed herein can include: a selector stage; a converter stage; and at least one intermediate stage between said selector stage and said converter stage if the number of converters in said converter stage is greater than or equal to 3, wherein: said selector stage and said at least one intermediate stage are made of a plurality of modular building blocks; said converter stage comprises a plurality of n converter circuits to output phase voltage references; and said selector stage, said converter stage, and said at least one intermediate stage are electrically connected in a symmetric or asymmetric pyramid formation having a base of said converter stage and an apex of said selector stage. In some configurations, each respective stage in said at least one intermediate stage can have half as many of said modular building blocks as an immediately lower stage. The plurality of n converter circuits can include two-level converters such as half-bridge circuits and multilevel converters such as half-bridge topologies of diode clamped, NPC, A-NPC, NPP, FCM, and MMC converters.

Each respective modular building block in said plurality of modular building blocks can include: an upper switch; a lower switch; and a midpoint. wherein: said upper switch has a first connection to either the midpoint of a first upper modular building block in the adjacent layer within the intermediate stage or the output terminal of a first upper converter in the adjacent converter stage, and a second connection to said midpoint; and said lower switch has a third connection to either the midpoint of a second lower modular building block in the adjacent layer within the intermediate stage or the output terminal of a second lower converter in the adjacent converter stage, and a fourth connection to said midpoint. The upper switch and the lower switch within the said modular building blocks are low-frequency or line-frequency soft-switching semiconductor devices, and the plurality of n converter circuits are high-frequency Pulse-Width Modulation (PWM) converters.

Modular building blocks of the same layer/column within the intermediate stage lacks electrical connection to each other.

The selector stage is switched at line-frequency and the converter stage is switched at a high-frequency PWM. The intermediate stage is switched at a low-frequency PWM.

An example integrated circuit for generating an AC voltage waveform as disclosed herein includes: a selector stage; a converter stage; and at least one intermediate stage between said selector stage and said converter stage if the number of converters in said converter stage is greater than or equal to 3, wherein: said selector stage and said at least one intermediate stage are made of a plurality of modular building blocks; said converter stage comprises a plurality of n converter circuits to output phase voltage references; and said selector stage, said converter stage, and said at least one intermediate stage are electrically connected in a symmetric or asymmetric pyramid formation having a base of said converter stage and an apex of said selector stage. The plurality of n converter circuits can include two-level converters such as half-bridge circuits and multilevel converters such as half-bridge topologies of diode clamped, NPC, A-NPC, NPP, FCM, and MMC converters.

Each respective modular building block in said plurality of modular building blocks can include: an upper switch; a lower switch; and a midpoint, where the upper switch has a first connection to either the midpoint of a first upper modular building block in the adjacent layer within the intermediate stage or the output terminal of a first upper converter in the adjacent converter stage, and a second connection to the midpoint; and the lower switch has a third connection to either the midpoint of a second lower modular building block in the adjacent layer within the intermediate stage or the output terminal of a second lower converter in the adjacent converter stage, and a fourth connection to the midpoint. The upper switch and the lower switch within the said modular building blocks are soft-switching low-frequency or line-frequency semiconductor switches, and the plurality of n converter circuits are high-frequency Pulse-Width-Modulation (PWM) converters.

Modular building blocks of the same layer/column within the intermediate stage may lack electrical connection to each other.

The selector stage is switched at line-frequency and the converter stage is switched at a high-frequency PWM. The intermediate stage is switched at a low-frequency PWM.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A pyramid-type multilevel converter, comprising:
    a symmetric selector stage;
    a converter stage; and
    at least one intermediate stage connected between said symmetric selector stage and said converter stage,
    wherein:
        said symmetric selector stage and said at least one intermediate stage are made of a plurality of modular building blocks;
        said converter stage comprises at least four multilevel converter circuits to output phase voltage references, wherein each of said at least four multilevel converter circuits comprise at least four switches grouped into at least two pairs of switches,
        where a pair mid-point of a pair of said at least two pairs of switches is electrically connected to a pair mid-point of a neighboring pair of said at least two pairs of switches using at least one clamping diode; and
        said symmetric selector stage, said converter stage, and said at least one intermediate stage are electrically connected in a pyramid formation having a base of said converter stage and an apex of said symmetric selector stage,
            wherein said at least four switches of each of said at least four multilevel converter circuits are electrically connected to said at least one intermediate stage via a converter mid-point of said at least four switches which is distinct from said pair mid-point;
        wherein each respective modular building block in said plurality of modular building blocks of said at least one intermediate stage comprises:
            an upper switch;
            a lower switch; and
            a modular midpoint, wherein said modular midpoint is directly connected to one of 1) a terminal of said symmetric selector stage, or 2) an additional modular building block in said plurality of modular building blocks of said at least one intermediate stage, wherein:
        said upper switch has a first connection terminal directly connected to one of: 1) said modular midpoint of a first upper modular building block in an adjacent layer within said at least one intermediate stage, or 2) said converter mid-point of said at least four switches of a first upper converter of said at least four multilevel converter circuits, and a second connection terminal connected to said respective modular midpoint; and
        said lower switch has a third connection terminal directly connected to one of: 1) said modular midpoint of a second lower modular building block in said adjacent layer within said at least one intermediate stage, or 2) said converter mid-point of said at least four switches of a second lower converter of said at least four multilevel converter circuits, and a fourth connection terminal connected to said respective modular midpoint.

2. The pyramid-type multilevel converter of claim 1, wherein said upper switch and said lower switch of each respective modular building block are soft-switching low-frequency Pulse-Width-Modulation (PWM) switches or line-frequency switches.

3. The pyramid-type multilevel converter of claim 2, wherein said at least four multilevel converter circuits comprise high-frequency Pulse-Width-Modulation (PWM) converters.

4. The pyramid-type multilevel converter of claim 1, wherein said plurality of modular building blocks of a same intermediate stage of said at least one intermediate stage lack direct connection to each other.

5. The pyramid-type multilevel converter of claim 1, wherein:
    said symmetric selector stage is switched at line-frequency;
    said at least one intermediate stage is switched at low-frequency PWM; and
    said converter stage is switched at high-frequency PWM scheme.

6. The pyramid-type multilevel converter of claim 1, wherein at least one of said at least four multilevel converter circuits comprises at least one half-bridge topology from the list of Flying-Capacitor Multilevel (FCM) and Modular Multilevel Converter (MMC).

7. The pyramid-type multilevel converter of claim 1, wherein said pyramid formation is a symmetric pyramid formation.

8. The pyramid-type multilevel converter of claim 1, wherein said pyramid formation is an asymmetric pyramid formation.

9. An integrated circuit for generating an Alternating Current (AC) voltage waveform, comprising:
    a symmetric selector stage;
    a converter stage; and
    at least one intermediate stage connected between said symmetric selector stage and said converter stage,
    wherein:
        said symmetric selector stage and said at least one intermediate stage are made of a plurality of modular building blocks;
        said converter stage comprises at least four multilevel converter circuits to output phase voltage references, wherein each of said at least four multilevel converter circuits comprise at least four switches grouped into at least two pairs of switches,
        where a pair mid-point of a pair of said at least two pairs of switches is electrically connected to a pair mid-point of a neighboring pair of said at least two pairs of switches using at least one clamping diode; and
        said symmetric selector stage, said converter stage, and said at least one intermediate stage are electrically connected in a pyramid formation having a base of said converter stage and an apex of said symmetric selector stage,
            wherein said at least four switches of each of said at least four multilevel converter circuits are electrically connected to said at least one intermediate stage via a converter mid-point of said at least four switches which is distinct from said pair mid-point, wherein each respective modular building block in said plurality of modular building blocks of said at least one intermediate stage comprises:
an upper switch;
a lower switch; and
a modular midpoint, wherein said modular midpoint is directly connected to one of 1) a terminal of said symmetric selector stage, or 2) an additional modular building block in said plurality of modular building blocks of said at least one intermediate stage, wherein:
said upper switch has a first connection terminal directly connected to one of: 1) said modular midpoint of a first upper modular building block in an adjacent layer within said at least one intermediate stage, or 2) said converter mid-point of said at least four switches of a first upper converter of said at least four multilevel converter circuits, and a second connection terminal connected to said respective modular midpoint; and
said lower switch has a third connection terminal directly connected to one of: 1) said modular midpoint of a second lower modular building block in said adjacent layer within said at least one intermediate stage, or 2) said converter mid-point of said at least four switches of a second lower converter of said at least four multilevel converter circuits, and a fourth connection terminal connected to said respective modular midpoint.

10. The integrated circuit of claim 9, wherein said upper switch and said lower switch of each respective modular building block are soft-switching low-frequency Pulse-Width-Modulation (PWM) switches or line-frequency semiconductor switches.

11. The integrated circuit of claim 10, wherein said at least four multilevel converter circuits comprise high-frequency Pulse-Width-Modulation (PWM) converters.

12. The integrated circuit of claim 9, wherein said plurality of modular building blocks of a same layer/column within said at least one intermediate stage lack direct connection to each other.

13. The integrated circuit of claim 9, wherein:
said symmetric selector stage is switched at line-frequency;
said intermediate stage is switched at low-frequency PWM; and
said converter stage is switched at high-frequency PWM scheme.

14. The integrated circuit of claim 9, wherein at least one of said at least four multilevel converter circuits comprises at least one half-bridge topology from the list of Flying-Capacitor Multilevel (FCM) and Modular Multilevel Converter (MMC).

15. The integrated circuit of claim 9, wherein said pyramid formation is a symmetric pyramid formation.

16. The integrated circuit of claim 9, wherein said pyramid formation is an asymmetric pyramid formation.

\* \* \* \* \*